(12) United States Patent
Sprague et al.

(10) Patent No.: US 8,237,892 B1
(45) Date of Patent: Aug. 7, 2012

(54) DISPLAY DEVICE WITH A BRIGHTNESS ENHANCEMENT STRUCTURE

(75) Inventors: Robert A. Sprague, Saratoga, CA (US); Craig Lin, San Jose, CA (US)

(73) Assignee: Sipix Imaging, Inc., Fremont, CA (US)

( * ) Notice: Subject to any disclaimer, the term of this patent is extended or adjusted under 35 U.S.C. 154(b) by 286 days.

(21) Appl. No.: 12/323,315

(22) Filed: Nov. 25, 2008

Related U.S. Application Data

(60) Provisional application No. 60/991,593, filed on Nov. 30, 2007.

(51) Int. Cl.
*G02F 1/1335* (2006.01)
*G02F 1/1339* (2006.01)

(52) U.S. Cl. .................. 349/95; 349/112; 349/156

(58) Field of Classification Search .............. 349/95, 349/112, 156
See application file for complete search history.

(56) References Cited

U.S. PATENT DOCUMENTS

| | | | |
|---|---|---|---|
| 4,083,626 A | 4/1978 | Miyahara et al. | |
| 5,151,801 A * | 9/1992 | Hiroshima | 349/95 |
| 6,144,430 A | 11/2000 | Kuo | |
| 6,277,263 B1 | 8/2001 | Chen | |
| 6,327,013 B1 | 12/2001 | Tombling et al. | |
| 6,556,261 B1 | 4/2003 | Krusius et al. | |
| 6,565,729 B2 | 5/2003 | Chen et al. | |
| 6,753,064 B1 | 6/2004 | Kim | |
| 6,784,962 B2 * | 8/2004 | Sumida et al. | 349/122 |
| 6,806,995 B2 | 10/2004 | Chung et al. | |
| 6,930,818 B1 | 8/2005 | Liang et al. | |
| 6,997,595 B2 * | 2/2006 | Mi et al. | 362/626 |
| 7,046,228 B2 | 5/2006 | Liang et al. | |
| 7,061,569 B2 * | 6/2006 | Yun et al. | 349/158 |
| 7,088,404 B2 | 8/2006 | Otake et al. | |
| 7,160,017 B2 | 1/2007 | Lee et al. | |
| 7,184,188 B2 * | 2/2007 | Kamijima | 359/237 |
| 7,244,476 B2 * | 7/2007 | Sumida et al. | 428/1.5 |
| 7,248,394 B2 | 7/2007 | Ding et al. | |
| 7,286,197 B2 * | 10/2007 | Kwon et al. | 349/112 |
| 7,294,866 B2 | 11/2007 | Liu | |
| 7,332,066 B2 | 2/2008 | Chen et al. | |
| 7,339,716 B2 | 3/2008 | Ding et al. | |
| 7,339,719 B1 | 3/2008 | Ding et al. | |
| 7,342,556 B2 | 3/2008 | Oue et al. | |
| 7,397,619 B2 * | 7/2008 | Hwang et al. | 359/833 |
| 7,463,317 B2 | 12/2008 | Takizawa et al. | |
| 7,564,519 B2 | 7/2009 | Takizawa | |

(Continued)

FOREIGN PATENT DOCUMENTS

WO    WO 2008/122927    10/2008

(Continued)

OTHER PUBLICATIONS

U.S. Appl. No. 12/837,350, filed Jul. 15, 2010, Sprague et al.

(Continued)

*Primary Examiner* — Rhonda Peace
(74) *Attorney, Agent, or Firm* — Perkins Coie LLP.

(57) ABSTRACT

The present invention is directed to display devices with a brightness enhancement structure comprising display cells comprising partition walls, and brightness enhancement micro-structures. The present invention is also directed to processes for the manufacture of display devices. The processes enable fabricating a display device with the micro-structures aligned with the display cells of the display device.

17 Claims, 16 Drawing Sheets

U.S. PATENT DOCUMENTS

| | | | |
|---|---|---|---|
| 7,576,914 B2 * | 8/2009 | Goto | 359/599 |
| 7,612,846 B2 | 11/2009 | Takizawa et al. | |
| 7,638,808 B2 | 12/2009 | Owen et al. | |
| 7,667,785 B2 * | 2/2010 | Van Gorkom et al. | 349/57 |
| 7,693,389 B2 * | 4/2010 | Kamijima | 385/147 |
| 2001/0006409 A1 * | 7/2001 | Lee | 349/156 |
| 2001/0026347 A1 * | 10/2001 | Sawasaki et al. | 349/156 |
| 2002/0033927 A1 * | 3/2002 | Mun et al. | 349/156 |
| 2002/0057413 A1 * | 5/2002 | Sumida et al. | 349/187 |
| 2003/0165016 A1 | 9/2003 | Whitehead et al. | |
| 2003/0234900 A1 | 12/2003 | Kim | |
| 2005/0003108 A1 * | 1/2005 | Sumida et al. | 428/1.1 |
| 2005/0012881 A1 * | 1/2005 | Liang et al. | 349/115 |
| 2005/0041311 A1 * | 2/2005 | Mi et al. | 359/831 |
| 2006/0103779 A1 * | 5/2006 | Amemiya et al. | 349/95 |
| 2007/0152592 A1 | 7/2007 | Kim et al. | |
| 2007/0200975 A1 * | 8/2007 | Kamijima | 349/95 |
| 2007/0253072 A1 | 11/2007 | Mullen et al. | |
| 2008/0012034 A1 | 1/2008 | Thielen et al. | |
| 2009/0231245 A1 | 9/2009 | Lin | |
| 2010/0141573 A1 | 6/2010 | Lin | |
| 2010/0177396 A1 | 7/2010 | Lin | |
| 2010/0182351 A1 | 7/2010 | Lin | |
| 2010/0225999 A1 | 9/2010 | Lin et al. | |
| 2010/0271407 A1 | 10/2010 | Ho et al. | |
| 2011/0043894 A1 | 2/2011 | Sprague et al. | |
| 2011/0057927 A1 | 3/2011 | Lin | |

FOREIGN PATENT DOCUMENTS

WO    WO 2009/114361    9/2009

OTHER PUBLICATIONS

U.S. Appl. No. 12/843,396, filed Jul. 26, 2010, Sprague et al.

* cited by examiner

DISPLAY DEVICE WITH A BRIGHTNESS ENHANCEMENT STRUCTURE

This application claims priority to U.S. provisional application No. 60/991,593, filed Nov. 30, 2007; which is incorporated herein by reference in its entirety.

FIELD OF THE INVENTION

The present invention is directed to display devices with a brightness enhancement structure and processes for their manufacture. The processes enable fabricating a display device with brightness enhancement micro-structures aligned with the display cells of the display device.

SUMMARY OF THE INVENTION

The brightness of a display panel, particularly an electrophoretic display panel, may be enhanced through the use of an array of brightness enhancement micro-structures fabricated on top of the viewing surface of the display panel. This may be accomplished by building a structure on top of the display cells to deflect the light striking the top viewing surface. Such a structure can serve two purposes. First, it can divert the illumination light from reaching the wall of the display cells onto the reflective surface of the display panel, thus saving this light which would have otherwise been transmitted by, or absorbed into, display cell walls (i.e., an inactive part of the display panel). Secondly, without the structure on top of the display cells, light scattered by the display panel in reflection which strikes the surface of the transparent material on top of the display panel at an angle greater than the critical angle is reflected back onto the display panel and most of it is lost to the viewer. The brightness enhancement micro-structures intercept these rays and redirect them more towards the viewer. In other words, the reflected rays strike the top surface at an angle less than the critical angle and are thus transmitted through the surface, achieving a second source of brightness enhancement. It is believed that such brightness enhancement techniques can potentially achieve a brightness enhancement of as much as two times of the original brightness.

The first aspect of the invention is directed to a display device which comprises (a) display cells comprising partition walls, and (b) a brightness enhancement structure comprising micro-structures, wherein said display cells are aligned with the micro-structures.

The second aspect of the invention is directed to a process for the manufacture of a display device, which process comprises (1) forming a brightness enhancement structure comprising micro-structures, (2) coating an electrode layer on a substrate layer over the micro-structures, (3) coating a photosensitive layer over the substrate layer, (4) radiating a light onto the photosensitive layer utilizing the micro-structures as a photomask, and (5) removing the exposed areas of the photosensitive layer to form display cells.

The third aspect of the invention is directed to a process for the manufacture of a display device, which process comprises (1) forming display cells on two substrate layers stacked together, (2) removing one of the two substrate layers which is further away from the display cells formed, and (3) laminating a brightness enhancement structure with micro-structures over the remaining substrate layer.

BRIEF DISCUSSION OF THE DRAWINGS

FIG. 4a shows a three-dimensional view of the brightness enhancement micro-structures formed in FIG. 3a.

DETAILED DESCRIPTION OF THE INVENTION

The present invention is directed to a display device which comprises (a) display cells comprising partition walls, and (b) a brightness enhancement structure comprising micro-structures, wherein said display cells are aligned with the micro-structures.

A "display device," as used herein, refers to a device that displays images. The display devices in this application include all types of reflective display devices such as electrophoretic display devices and liquid crystal display devices. Electrophoretic display devices are preferred for this invention.

Figure 3A:
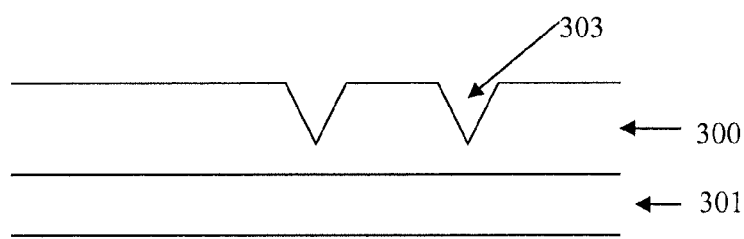
FIGS. 3a-3f illustrate a process of the present invention.
Figure 3B:
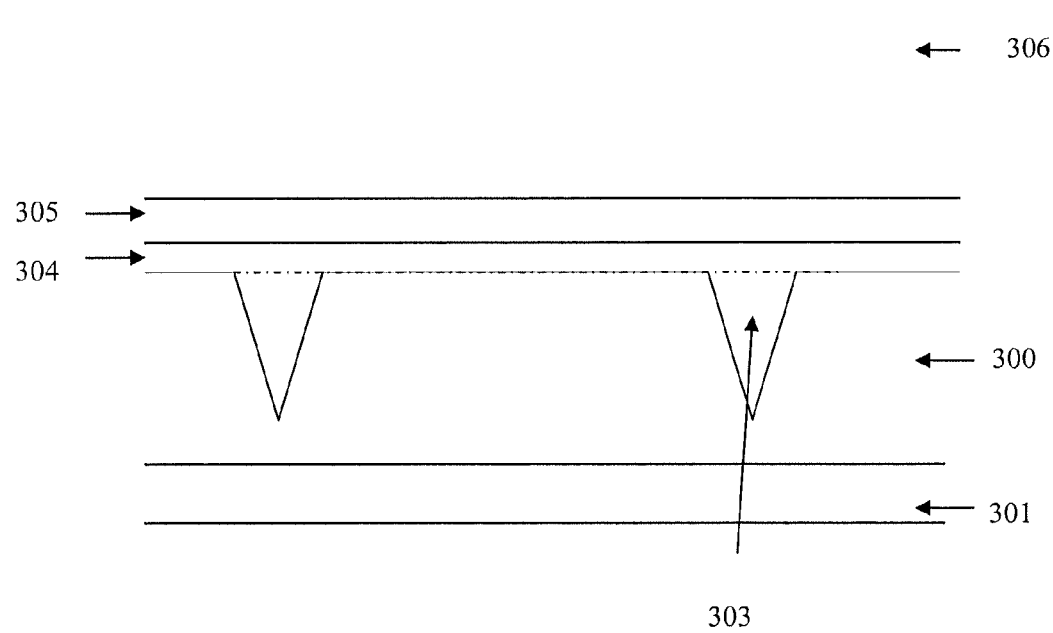
Figure 3C:
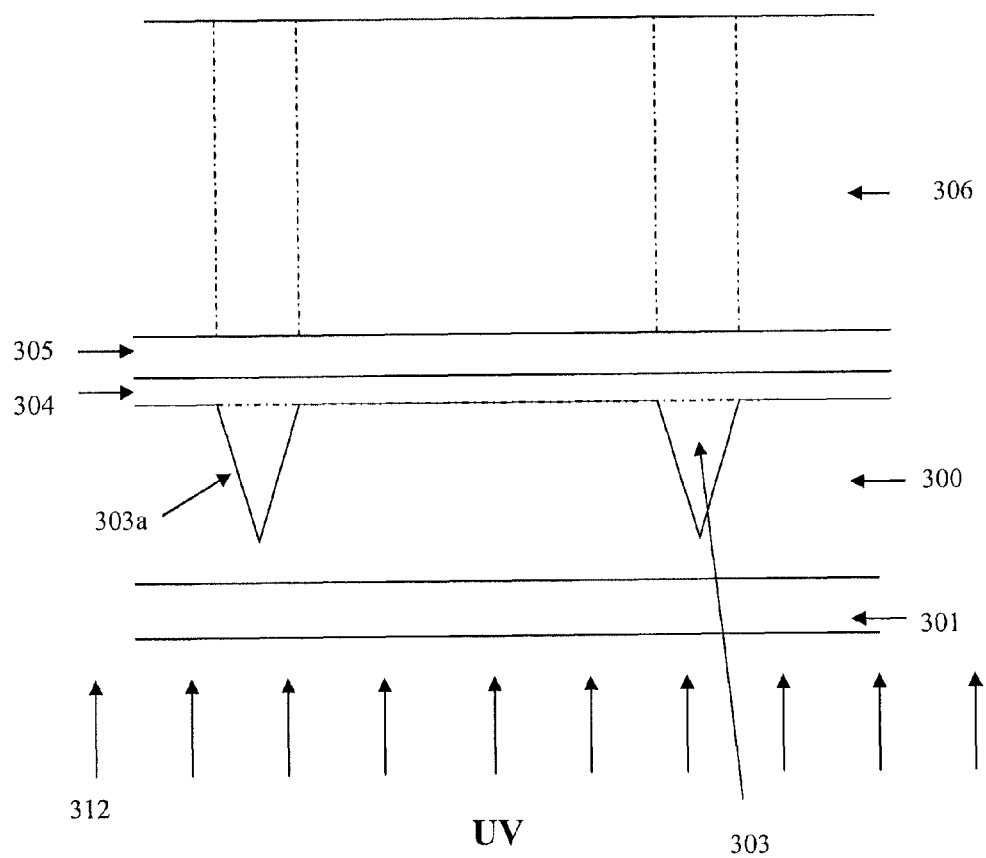
Figure 3D:
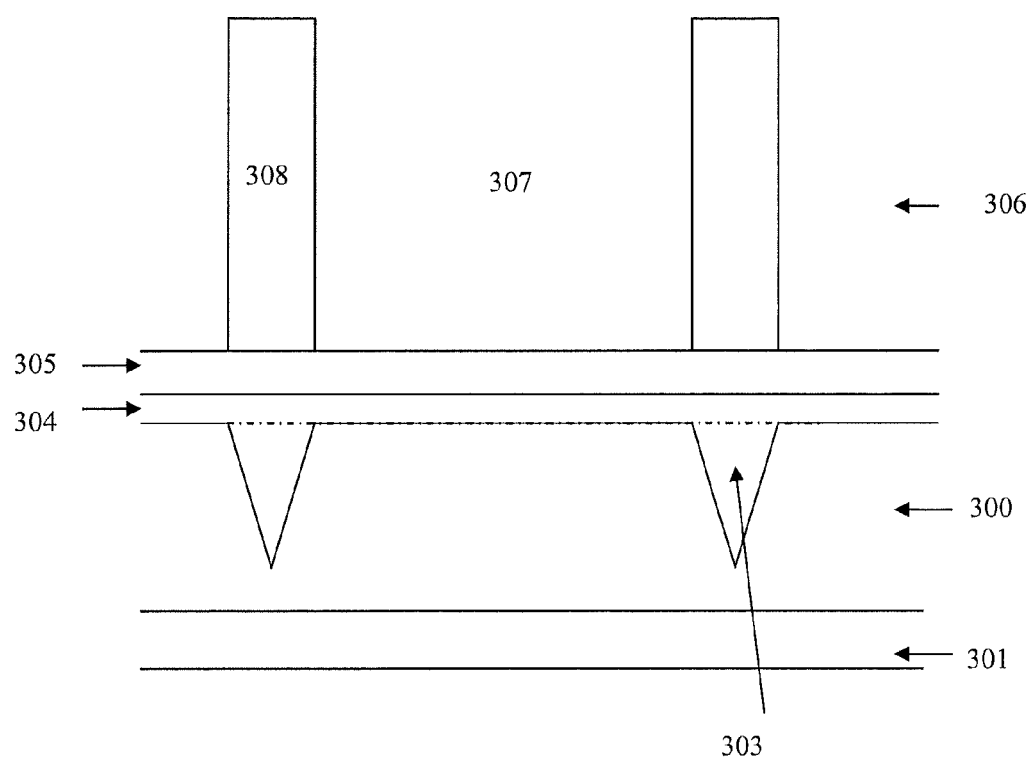
Figure 3E:
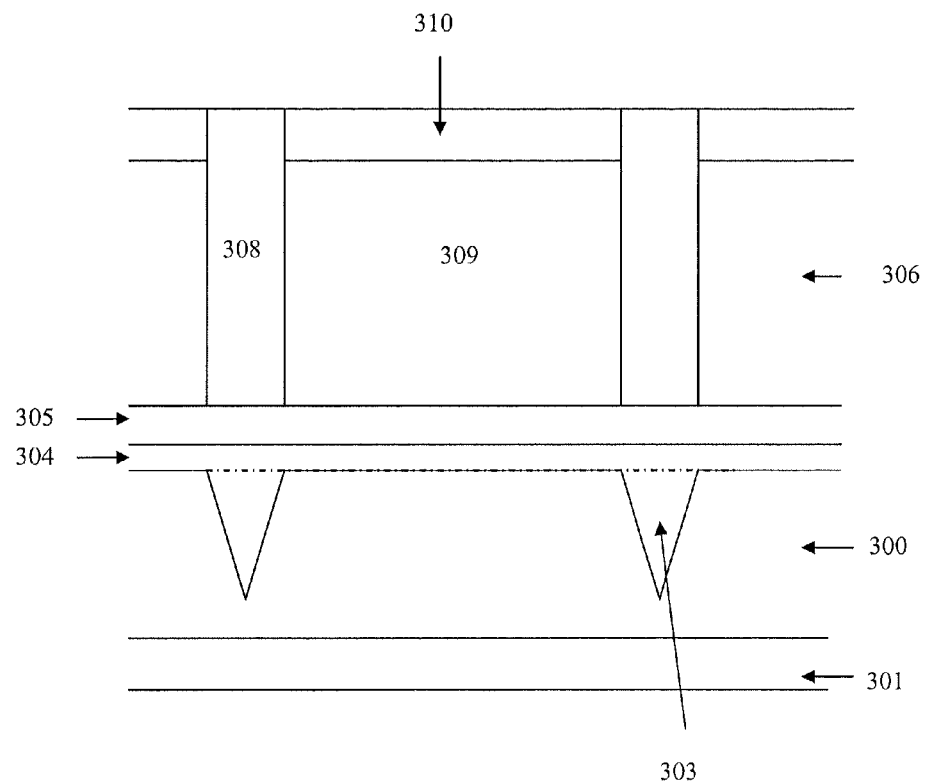
Figure 3F:
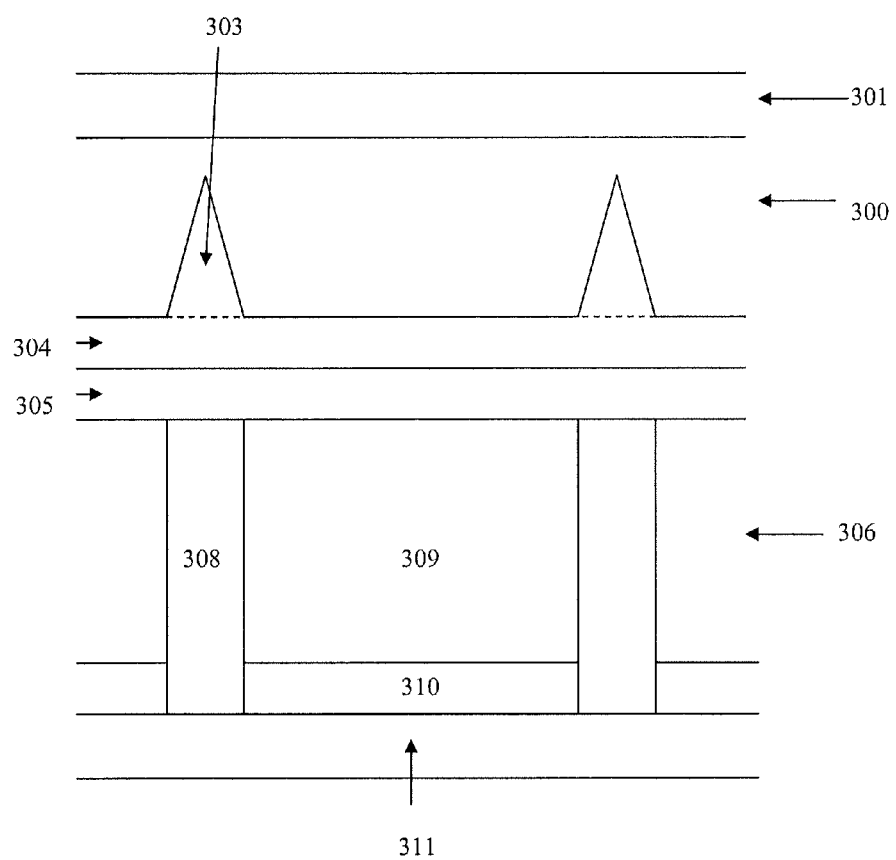
Figure 4A:
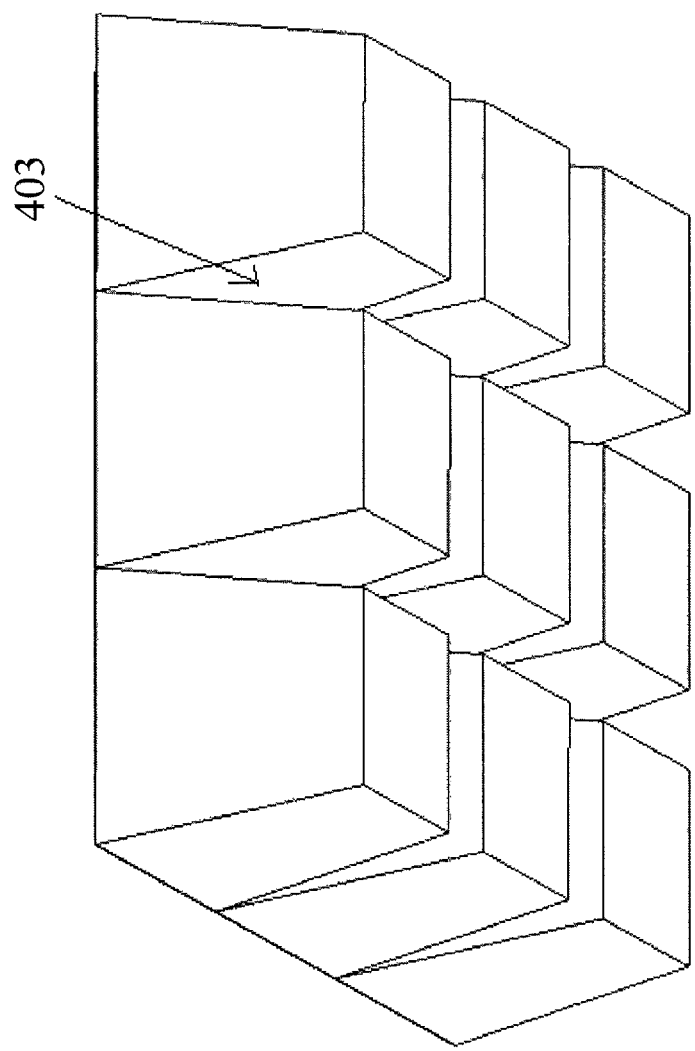
Figure 5A:
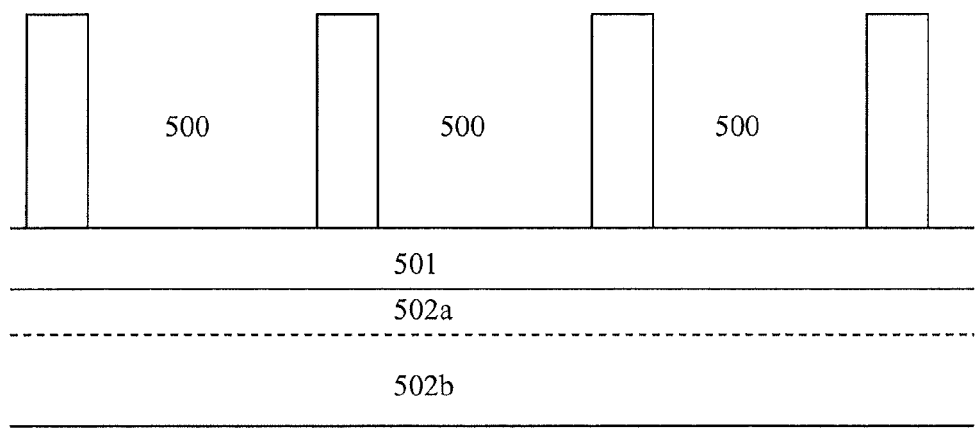
FIGS. 5a-5c illustrate an alternative process of the present invention.
Figure 5B:
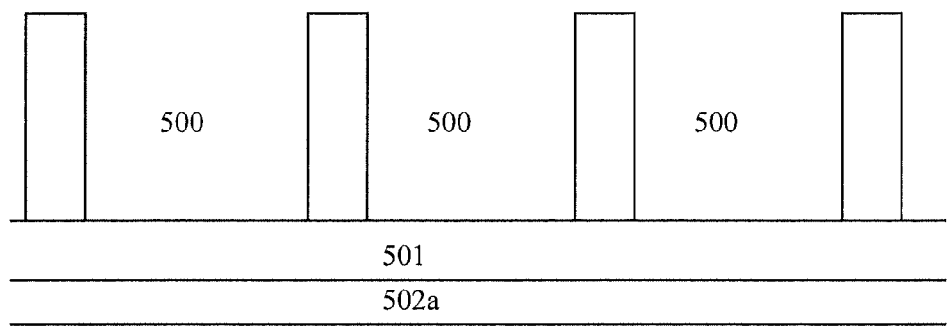
Figure 5C:
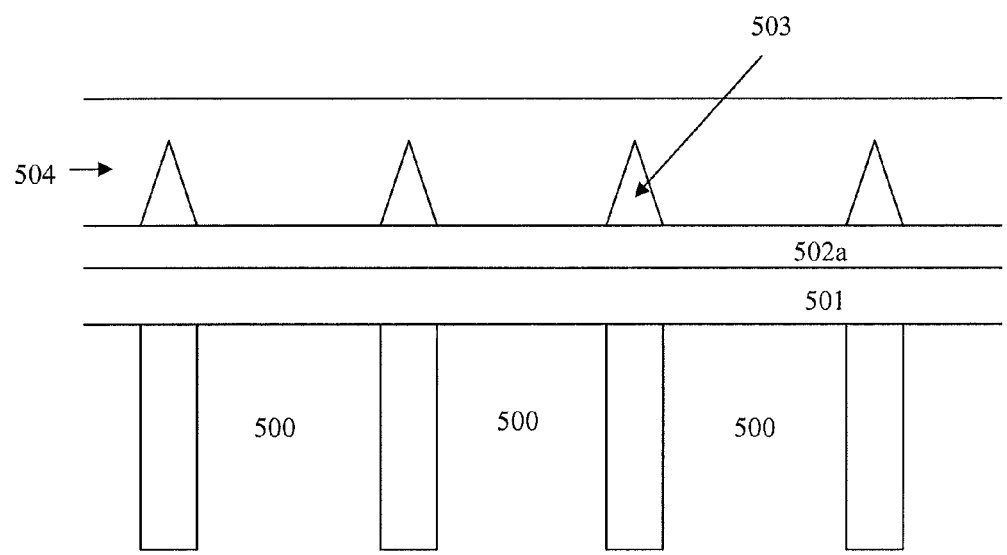
Figure 6:
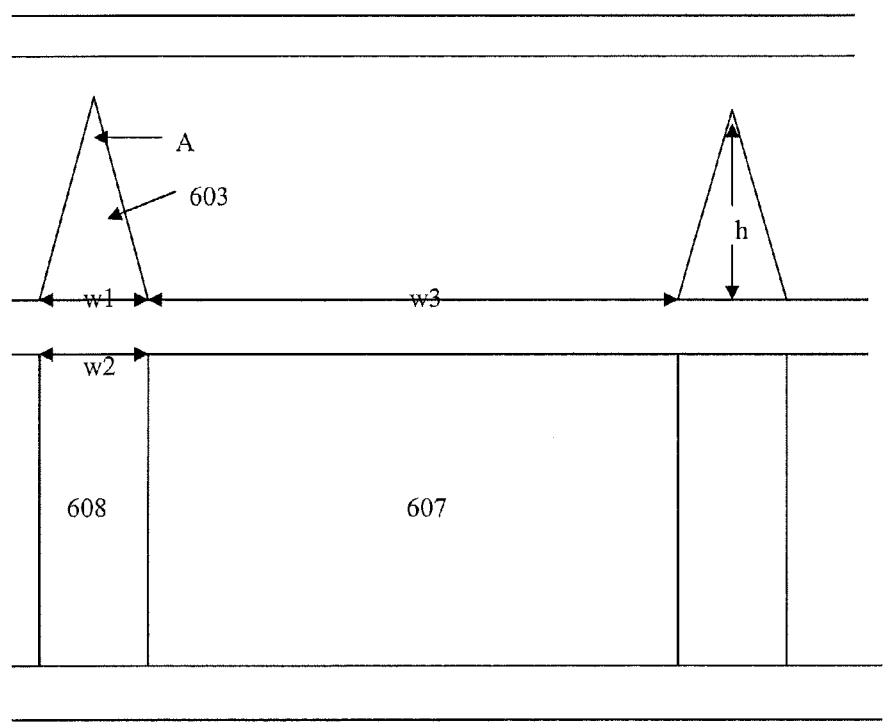
FIG. 6 illustrates the configuration of a brightness enhancement structure with brightness enhancement micro-structures, in a cross-section view.
Figure 7A:
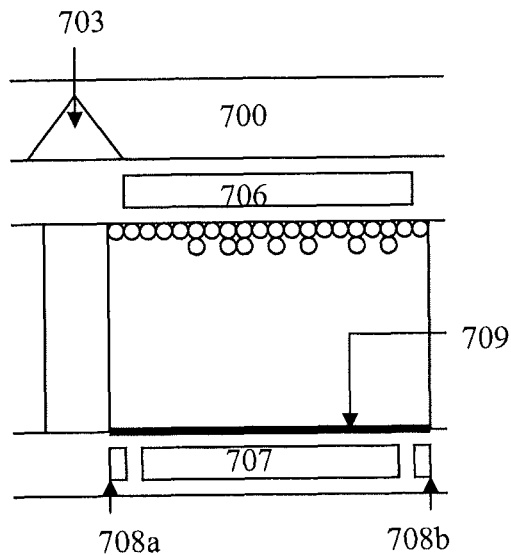
FIGS. 7a-7c depict a color display device which has a dual switching mode and a brightness enhancement structure with micro-structures on the viewing surface of the display device.

"Micro-structures" as used herein, refer to the cavities as illustrated in FIGS. 3a-3f (303), FIG. 4a (403), FIG. 5c (503), FIG. 6 (603), and FIG. 7a (703). The dimensions of the cavities (i.e., micro-structures) are illustrated in the present application. The cavities in general may have a width and height between 1-1000 microns, preferably 10-500 microns, and more preferably 20-300 microns.

Figure 1A:
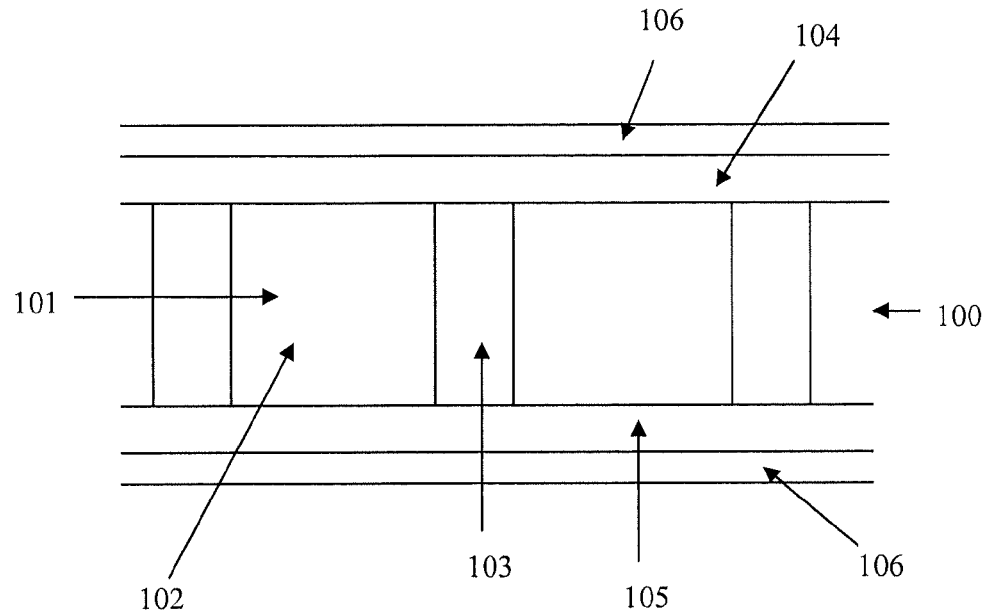
FIGS. 1a and 1b depict display devices.

FIG. 1a illustrates a display device (100). The device comprises an array of display cells (101) filled with a display fluid (102). Each of the display cells is surrounded by partition walls (103). The array of display cells is sandwiched between two electrode layers (104 and 105).

For an electrophoretic display device, the display cells are filled with an electrophoretic fluid which comprises charged particles dispersed in a solvent. The display fluid may be a system comprising one or two types of particles. In the system comprising only one type of particles, the charged particles are dispersed in a solvent of a contrasting color. The charged particles will be drawn to one of the electrode layers (104 or 105), depending on the potential difference of the two electrode layers, thus causing the display panel to show either the color of the particles or the color of the solvent, at the viewing side.

In a system comprising particles carrying opposite charges and of two contrasting colors, the particles would move to one electrode layer or the other, based on the charge that they carry and the potential difference of the two electrode layers, causing the display panel to show the two contrasting colors, at the viewing side. In this case, the particles may be dispersed in a clear solvent.

The display cells may also be filled with a liquid crystal composition. In addition, it is understood that the present invention is applicable to all types of reflective display devices.

For a segment display device, the two electrode layers (104 and 105) are one common electrode (e.g., ITO) and one patterned segment electrode layer, respectively. For an active matrix display device, the two electrode layers (104 and 105) are one common electrode and an array of thin film transistor pixel electrodes, respectively. For a passive matrix display device, the two electrode layers (104 and 105) are two line-patterned electrode layers. The electrode layers are usually formed on a substrate layer (106) (such as polyethylene terephthalate, PET). The substrate layer may also be a glass layer.

Figure 1B:
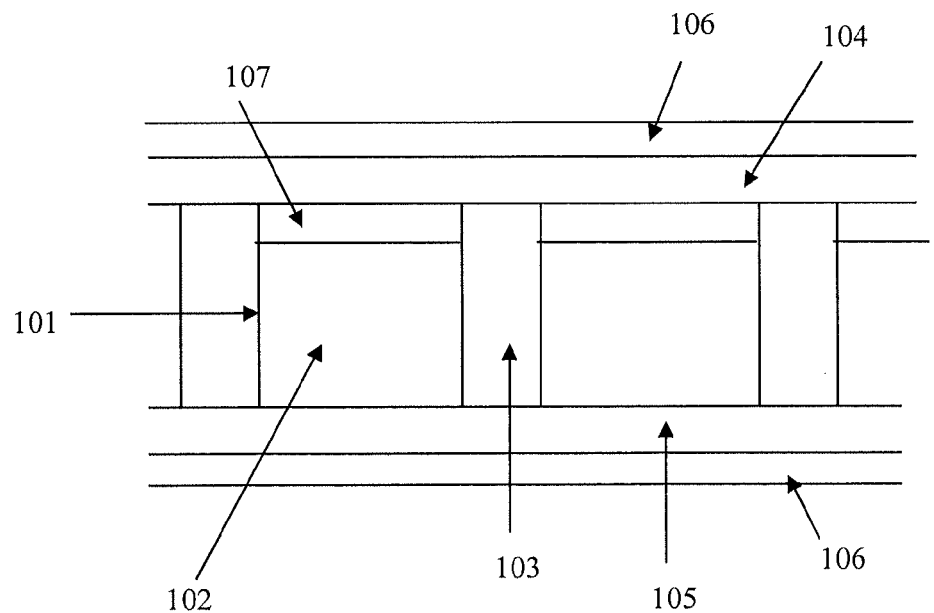

For a microcup-based display device as shown in FIG. 1*b* and disclosed in U.S. Pat. No. 6,930,818, the content of which is incorporated herein by reference in its entirety, the filled display cells are sealed with a polymeric sealing layer (107). Such a display device may be viewed from the sealing layer side or the side opposite the sealing layer side, depending on the transparency of the materials used and the application.

Figure 2A:
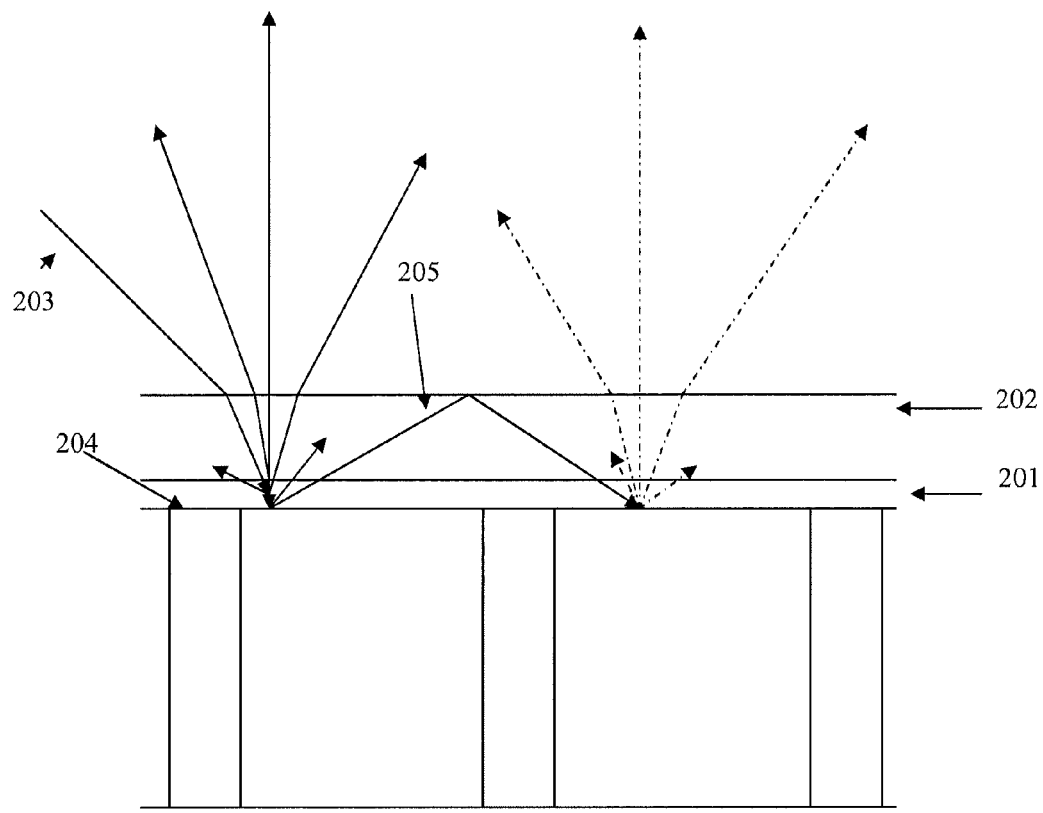
FIG. 2a illustrates the phenomenon of total internal reflection.

FIG. 2*a* illustrates the phenomenon of total internal reflection. In this figure, the ITO electrode layer (201) and the substrate layer (202) (e.g., PET) are transparent. When incoming light (203) reaches the surface (204) of the display cells, most of the light scatters as shown. However, some of scattering light (205) reflects back to the surface (204) of the display cells because of the presence of the substrate layer (202) which has a higher refractive index (usually about 1.5) than the air (which has a refractive index of about 1) surrounding the display panel. This total internal reflection phenomenon can result in a loss of about 30-50% of the scattering light, thus causing reduction of the brightness of the display panel.

The loss of the scattering light may be at least partially eliminated if a brightness enhancement structure with brightness enhancement micro-structures is fabricated on the top surface of the display device, on the viewing side. In some cases, the loss due to the total internal reflection may be completely eliminated with the use of such a brightness enhancement structure. The brightness enhancement micro-structures deflect the light which otherwise would have been lost due to total internal reflection at the top front surface (202) of the display device. With the presence of the micro-structures, the light may strike the top surface of layer 202 at an angle less than the critical angle and is thus transmitted through the layer. The critical angle of incidence for total internal reflection, as defined by the angle of incidence which provides an angle of refraction of 90°, is well known to those skilled in the art as $\sin^{-1}(n2/n1)$, where n2 is the index of refraction of air and n1 is the index of refraction of layer 202.

Figure 2B:
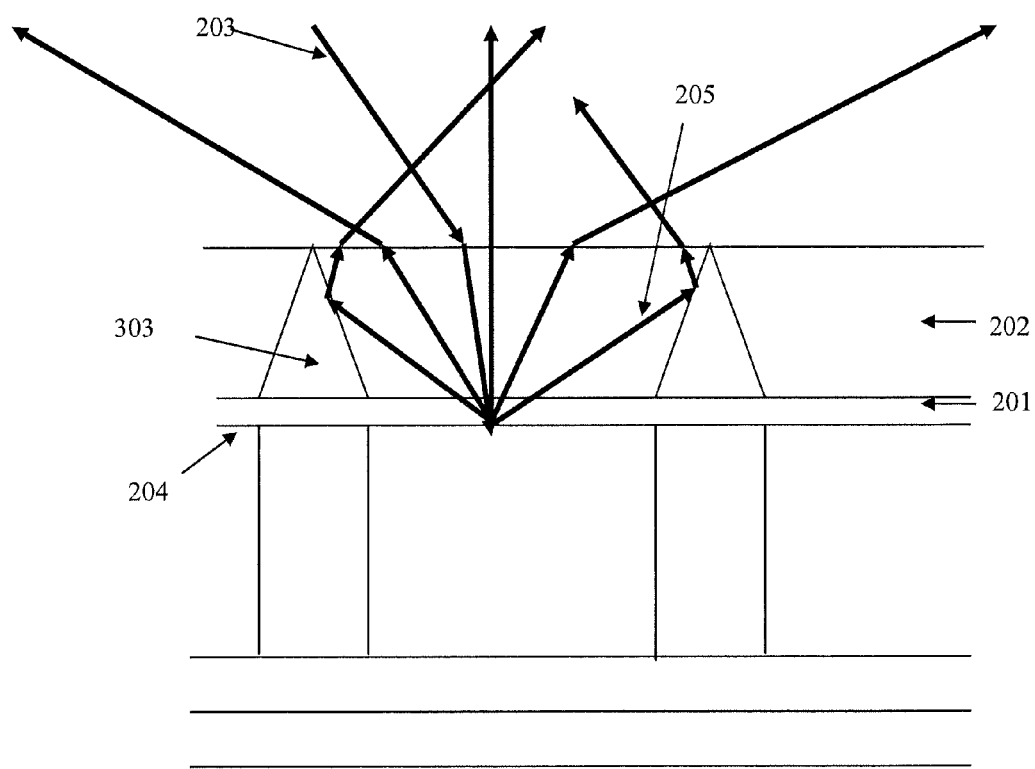
FIG. 2b illustrates how a brightness enhancement structure with brightness enhancement micro-structures on top of a display device may deflect the scattering light.

FIG. 2*b* illustrates how a brightness enhancement structure with brightness enhancement micro-structures (303) on top of a display cell structure can deflect the scattered light (205).

Fabrication of a Display Device with a Brightness Enhancement Structure

FIGS. 3*a*-3*f* illustrate a process of the present invention. FIG. 3*a* shows the first step of the process which is to create prism-like brightness enhancement micro-structures. This may be accomplished by an embossing process carried out at a temperature higher than the glass transition temperature of the embossable composition (300) coated on a substrate layer (301). The embossing is usually accomplished by a male mold which may be in the form of a roller, plate or belt. The embossable composition may comprise a thermoplastic, thermoset or a precursor thereof. More specifically, the embossable composition may comprise multifunctional acrylate or methacrylate, multifunctional vinylether, multifunctional epoxide or an oligomer or polymer thereof. The glass transition temperatures (or Tg) for this class of materials usually range from about −70° C. to about 150° C., preferably from about −20° C. to about 50° C. The embossing process is typically carried out at a temperature higher than the Tg. A heated male mold or a heated housing substrate against which the mold presses may be used to control the embossing temperature and pressure. The male mold is usually formed of a metal such as nickel.

As shown in FIG. 3*a*, the mold creates the prism-like brightness enhancement micro-structures (303) and is released during or after the embossable composition is hardened. The hardening of the embossable composition may be accomplished by cooling, solvent evaporation, cross-linking by radiation, heat or moisture.

In the context of the present invention, the cavity 303 is referred to as a micro-structure. It is not necessary for the micro-structures to be coated with a metal layer.

In order to carry out the subsequent steps of the process, the hardened embossable composition (300) must be substantially transparent.

The refraction index of the material for forming the brightness enhancement structure is preferably greater than about 1.4, more preferably between about 1.5 and about 1.7.

FIG. 4*a* is a three-dimensional view of the brightness enhancement structure with brightness enhancement micro-structures (403), as shown in FIG. 3*a*.

In FIG. 3*b*, an electrode layer (304) coated on a substrate layer (305) is laminated over the brightness enhancement micro-structures (303) as shown, which is followed by further coating a photosensitive layer (306) on the side of the substrate layer (305). The inner space of the brightness enhancement micro-structures is preferably left empty in order to maintain the needed difference of refractive indexes between the inner space and the material forming the micro-structures.

In FIG. 3*c*, a light source (312) (e.g., the UV light) radiates from the side of the brightness enhancement micro-structures as shown and the brightness enhancement micro-structures serve as a photomask in this photolithography process. The light (312) radiates through the opening area between the brightness enhancement micro-structures onto the photosensitive layer (306).

The light (312) is parallel and collimated, as shown. Such light, when travels through the layer 300 and strikes the surface (303*a*) of the micro-structures (303), is reflected from the surface (303*a*) because of the angle of incidence is greater than the critical angle of total internal reflection. In other words, the light (312) cannot be transmitted through the micro-structures and therefore, the micro-structures serve as an effective photomask.

In FIG. 3*d*, the exposed areas (between the brightness enhancement micro-structures) of the photosensitive layer are removed by an appropriate solvent or developer to form the display cells (307). The solvent or developer is selected from those commonly used for dissolving or reducing the viscosity of a photosensitive material, and could be methylethylketone (MEK), toluene, acetone, isopropanol or the like. The unexposed areas (protected from exposure by the brightness enhancement micro-structures) become hardened to form partition walls (308) which surround the display cells.

Figure 4B:
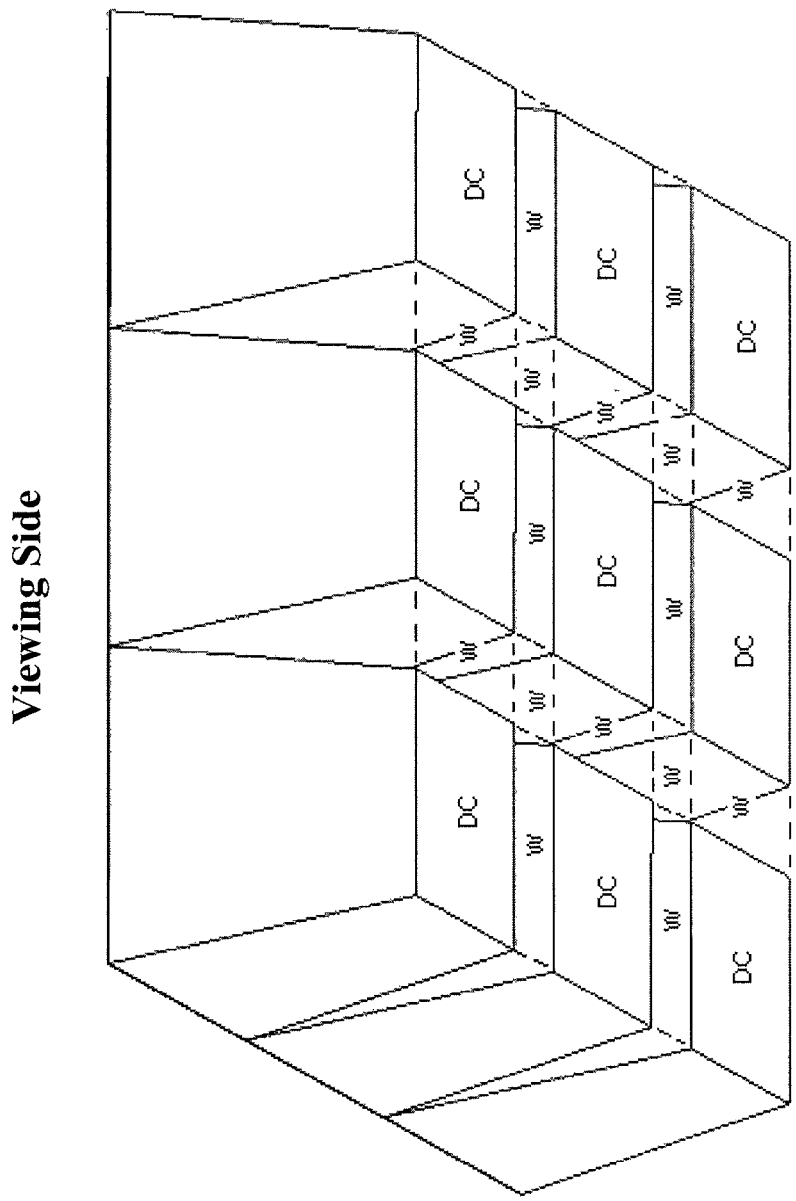
FIG. 4b shows a three dimensional view of how the display cells with partition walls are formed in relation to the brightness enhancement micro-structures.

FIG. 4*b* is a three-dimensional view of how the display cells with partition walls are aligned with the brightness enhancement micro-structures. The areas marked "DC" correspond to the areas on which display cells are formed and the areas marked "W" correspond to the areas on which the partition walls are formed.

In FIG. 3e, the display cells thus formed are then filled with a display fluid (309). The filled display cells may be sealed with a polymeric sealing layer (310) by any of the methods as disclosed in U.S. Pat. No. 6,930,818, the content of which is incorporated herein by reference in its entirety.

Depending on the type of the display device, a second electrode layer (311), e.g., a segment electrode layer, a thin film transistor pixel electrode layer or a line patterned electrode layer, is laminated over the filled and sealed display cells as shown in FIG. 3f, optionally with an adhesive layer (not shown).

It is noted that while the display cells are shown in FIGS. 3d-3e to be on top of the brightness enhancement microstructures, the display device, when in use, is in fact turned 180°. In other words, the brightness enhancement micro-structures are on top of the display cells (as shown in FIG. 3f) to allow the brightness enhancement micro-structures to deflect the light striking the top surface of the display device. Accordingly, the display device as shown in FIG. 3f is viewed from the side as marked.

In order for the brightness enhancement structure to have an optimal effect, the distance between the brightness enhancement structure and the display cells should be kept as small as possible. This may be achieved by an alternative process as shown in FIGS. 5a-5c. In this alternative process, the display cells are not formed directly on the brightness enhancement structure with micro-structures. Instead, the brightness enhancement structure and a layer of display cells are fabricated separately and later combined.

In FIG. 5a, it is shown that a layer of display cells (500) (e.g., microcups) are formed on an electrode layer (501) laminated on two substrate layers (502a and 502b) stacked together. The two substrate layer may be separated from each other with ease. After the display cells are formed, one (502b) of the two substrate layers which is further away from the display cells is removed as shown in FIG. 5b.

Subsequently a separately fabricated brightness enhancement structure (504) with micro-structures (503) is laminated onto the remaining substrate layer (502a), as shown in FIG. 5c. In this figure, the brightness enhancement micro-structures are shown to be on top of the display cells to allow the brightness enhancement micro-structures to deflect the light striking the top surface of the display device, and in other words, the finished display device is viewed from the side as marked.

The two substrate layers in this process are needed to ensure mechanical integrity during formation of the display cells. After the display cells are formed, one of the substrate layers is removed to reduce the thickness of the substrate layer between the display cells and the brightness enhancement structure, thus reducing the distance between the display cells and the brightness enhancement structure.

In this alternative process, the display cells may be filled and sealed before or after the brightness enhancement structure is laminated over the layer of display cells. The lamination of the second electrode layer over the filled and sealed display cells may also be carried out before or after the brightness enhancement structure and the layer of display cells are laminated together.

The Dimensions of the Brightness Enhancement Micro-Structures

Because of the presence of a substrate layer which has a higher refractive index than the air surrounding a display panel, some of the scattered light from the display may be reflected back to the display cell surface. In an example without the brightness enhancement structure, assuming the refractive index of the substrate layer being about 1.5, the critical angle for reflection calculated based on the Snell's law equation would be approximately 42°. The critical angle of 42° is calculated from $\sin^{-1}(n2/n1)$ and in this example, "n2" is 1 which is the index of refraction of air and "n1" is 1.5 which is the index of refraction of the material for the transparent top surface. Any light striking the top surface of the display panel at an angle higher than the critical angle 42° would be reflected. In other words, any scattered light having an angle of incidence greater than 42°, will undergo a total internal reflection when reaching the boundary between the substrate layer and the air, and thus be reflected back to the display.

The brightness enhancement micro-structures are configured to intercept the scattered light rays (as shown in FIG. 2b) which could potentially be lost due to total internal reflection and redirect them toward the viewer. In other words, the presence of the brightness enhancement micro-structures allows the scattered light to strike the top surface at an angle less than the critical angle.

FIG. 6 shows a display device with aligned brightness enhancement micro-structures and display cell walls. The base of the brightness enhancement micro-structures is chosen to be the same width or wider than the partition walls (and sit on top of the partition walls), so that light striking the display cell structure which would normally be lost to the wall region is redirected by the brightness enhancement microstructures onto the active display surface.

The brightness enhancement micro-structures (603), as shown in FIG. 6, have a base width ("w1") which is substantially equal to the width ("w2") of the partition walls (608), a height ("h") and a top angle (A). In one example, if the cell (607) width ("w3") between the brightness enhancement micro-structures is about 100 microns and the width ("w2") of the cell walls is about 40 microns, then the optimal height ("h") of the brightness enhancement micro-structures to intercept all the light rays would be about 133 microns. In this example, the top angle A of the micro-structure would be about 17°. The height ("h") of the micro-structures is selected to intercept most or all of the light reflected from the display at an angle greater than 42°. An alternative design may have a greater top angle ("A") (e.g., greater than 30°, more preferably greater than 40°) of the brightness enhancement micro-structure so that the light scattered from the center of the display cells is redirected more towards the viewer, giving enhanced on-axis brightness.

Other configurations of the brightness enhancement micro-structures may also be chosen, based on criteria such as the desirable cell size, the minimum or maximum wall dimensions and other factors. The height will be selected as described above, but it is in general preferred that the height (h) of the brightness enhancement micro-structures will fall in the range of 0.3 to 2 times of the width of the display cells (w3).

The brightness enhancement micro-structures of the present invention are also suitable for a multi-color display utilizing color filters. Using FIG. 1b for illustration, the color filters may be placed on top of the substrate (106) of the display device or between the substrate (106) and the electrode layer (104) or between the electrode layer (104) and the sealing layer (107). In this case, the color filters are underneath the micro-structures. The presence of the color filters could cause a significant loss of light energy. The presence of the micro-structures compensates the effect of such loss and provides sufficient on-axis brightness.

In addition, there are dead spots between filters of different colors. When the brightness enhancement structure is used, the micro-structures may be aligned with the dead spots and the dead spots could be hidden underneath the micro-structures, thus effectively increasing the aperture ratio of the display device.

Alternatively, the color filters may be placed on top of the brightness enhancement structure.

The brightness enhancement structure with micro-structures may also be applied to a color display device with a dual switching mode. U.S. Pat. No. 7,046,228 discloses an electrophoretic display device having a dual switching mode which allows the charged pigment particles in a display cell to move in either the vertical (up/down) direction or the planar (left/right) direction. The content of U.S. Pat. No. 7,046,228 is incorporated in this application by reference in its entirety.

Figure 7B:
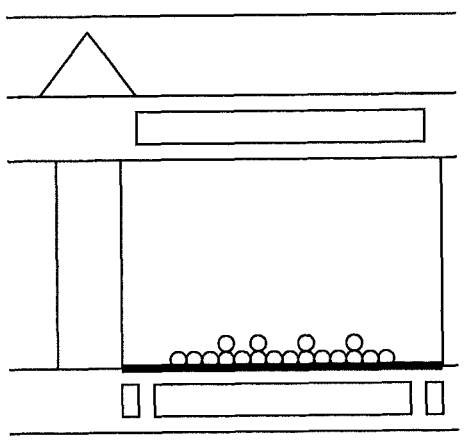
Figure 7C:
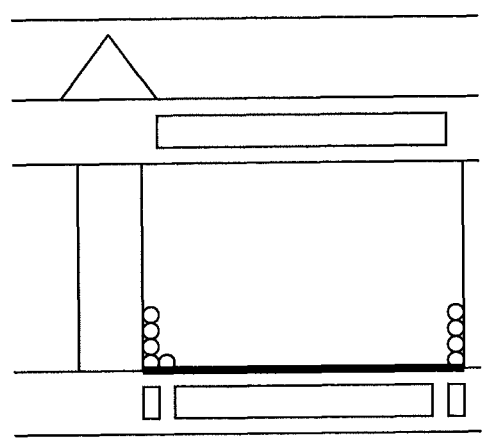

The dual mode display device with a brightness enhancement structure is illustrated in FIGS. 7a-7c. In such a display device, each of the display cells is sandwiched between two layers, one of which comprises a common electrode whereas the other layer comprises a center electrode and at least one in-plane electrode. For illustration purpose, it is assumed that the display cells are filled with a clear, but colored dielectric solvent with charged white pigment particles dispersed therein and the background color of the display cells is black.

While the charged pigment particles are driven to be at or near the transparent common (706), the color of the particles is seen, from the top viewing side (see FIG. 7a). While the charged pigment particles are driven to be at or near the center electrode (707), the color of the solvent is seen (see FIG. 7b) and while the charged pigment particles are driven to be at or near the in-plane electrode(s) (708a and 708b), the color of the display cell background (709) is seen (see FIG. 7c), from the viewing side. Accordingly, each of the display cells is capable of displaying three color states, i.e., the color of the charged pigment particles, the color of the dielectric solvent or the background color of the display cell. The dual mode display device may be driven by an active matrix system or by a passive matrix system.

The brightness enhancement structure (700) with micro-structures (703) may be prepared by any one of the methods illustrated above.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A display device comprising:
a) an electrophoretic display comprising display cells each of which is surrounded by partition walls and filled with an electrophoretic fluid; and
b) a brightness enhancement structure comprising micro-structures, wherein said micro-structures are on top of said partition walls and are separated from each other and they are not coated with a metal layer, wherein said micro-structures allow light that is reflected from the surface of the display cells and strikes the micro-structures to be deflected from the micro-structures, said light then strikes a top layer of the display device and transmits through the top layer; wherein the width of the partition walls is substantially equal to the width of the base of the micro-structures.

2. The display device of claim 1, wherein the inner space of the micro-structures are left empty.

3. The display device of claim 1, wherein the top angle of the micro-structure is greater than 30°.

4. The display device of claim 1, wherein the top angle of the micro-structure is greater than 40°.

5. The display device according to claim 1, wherein said display cells are sandwiched between a first layer comprising a common electrode and a second layer comprising a center electrode and at least one in-plane electrode.

6. The color display device of claim 5, wherein the electrophoretic fluid comprises charged pigment particles dispersed in a dielectric solvent or solvent mixture.

7. The color display device of claim 6, wherein each display cell displays the color of the charged pigment particles, the color of the dielectric solvent or solvent mixture or a background color.

8. The display device of claim 1, wherein the electrophoretic fluid comprises charged pigment particles dispersed in a solvent.

9. A display device comprising:
a) an electrophoretic display comprising display cells each of which is filled with an electrophoretic fluid;
b) a brightness enhancement structure comprising micro-structures, wherein said micro-structures are separated from each other and they are not coated with a metal layer, wherein said micro-structures allow light that is reflected from the surface of the display cells and strikes the micro-structures to be deflected from the micro-structures, said light then strikes a top layer of the display device and transmits through the top layer; and
c) color filters; wherein dead spots between the color filters are aligned with the micro-structures.

10. The display device of claim 9, wherein the micro-structures are on top of the color filters.

11. The display device of claim 9, wherein the color filters are on top of the micro-structures.

12. A process for the manufacture of a display device, which process comprises
a) forming a brightness enhancement structure comprising micro-structures;
b) coating an electrode layer on a substrate layer over the micro-structures;
c) coating a photosensitive layer over the substrate layer;
d) radiating a light onto the photosensitive layer utilizing the micro-structures as a photomask; and
e) removing the exposed areas of the photosensitive layer to form display cells.

13. The process of claim 12, further comprising filling the display cells with a display fluid and sealing the filled display cells with a polymeric sealing layer.

14. The process of claim 13, further comprising laminating a second electrode layer over the filled and sealed display cells.

15. The process of claim 12, wherein the micro-structures are formed by embossing.

16. The process of claim 12, wherein said photosensitive layer comprises a positively working photoresist.

17. The process of claim 12, wherein the display cells comprise partition walls and the micro-structures are aligned with the partition walls and sit on top of the partition walls.

* * * * *